United States Patent

[11] 3,599,151

[72] Inventor Jerome Danforth Harr
San Jose, Calif.
[21] Appl. No. 888,628
[22] Filed Dec. 29, 1969
[45] Patented Aug. 10, 1971
[73] Assignee International Business Machines Corporation
Armonk, N.Y.

[54] CHARACTER RECOGNITION PHOTOSENSING APPARATUS HAVING A THRESHOLD COMPARATOR CIRCUIT
8 Claims, 13 Drawing Figs.

[52] U.S. Cl. 340/146.3 AG
328/135, 328/147, 328/151
[51] Int. Cl. G06k 9/00
[50] Field of Search 340/146.3, 347; 328/135, 147, 151

[56] References Cited
UNITED STATES PATENTS

| | | | |
|---|---|---|---|
| 3,159,815 | 12/1964 | Groce | 340/146.3 R |
| 3,210,729 | 10/1965 | Lozier, Jr. et al. | 340/146.3 R |
| 3,225,213 | 12/1965 | Hinrichs et al. | 340/146.3 UX |
| 3,415,950 | 12/1968 | Bartz et al. | 340/146.3 X |
| 3,528,058 | 9/1970 | Bond | 340/146.3 Z |

*Primary Examiner*—Maynard R. Wilbur
*Assistant Examiner*—Leo H. Boudreau
*Attorneys*—Hanifin and Jancin and George E. Roush

ABSTRACT: The recognition of human and machine readable characters of a family of type of which each character has one or more narrow line segments on a contrasting background and is enhanced by a positive and negative peaked level photosensing arrangement. The sensing apparatus comprises an optoelectronic circuitry for interpreting optomechanical gated scanning of short straight line segments in seriatim. It produces an electric representation in response to the presence and absence of a character line segment in the image. A photosensitive element is arranged to receive light from an area on a document. The highest and lowest light values are translated in a reference level clamping circuit followed by positive and negative peak storage circuits. A threshold comparator circuit is individually coupled to the positive and negative peak storage circuits for delivering potential levels of two values indicating marks or spaces (the absence of marks). Preferably, threshold adjusting circuitry is interposed between one of the peak storage circuits and the threshold comparator circuit. Dynamic adjusting thresholding circuitry is included. Analog control circuitry is coupled to the storage and thresholding circuitry for timing and controlling the overall system by timing pulses conventionally obtained.

*INVENTOR*
JEROME D. HARR

*BY* [signature]
ATTORNEY

CHARACTER RECOGNITION PHOTOSENSING APPARATUS HAVING A THRESHOLD COMPARATOR CIRCUIT

This application is related to the copending U.S. Pat. application Ser. No. 888,626 filed on the 29th day of Dec. 1969, of Jerome Danforth Harr, Reynold Benjamin Johnson, Ralph Eugene Marrs, Ernie George Nassimbene, and George Edmund Price for Character Recognition Scanning Apparatus. That application relates to a dual-risk optomechanical and photoresponsive scanning apparatus, particularly for recognizing constrained characters readily on sight and also by character recognition apparatus of a type suitable for use with the photosensing circuitry described and claimed herein.

In the contemporary alphameric character art, attention is being directed to simplified, low cost printing apparatus and the corresponding character recognition apparatus, both compatible with hand lettering and sight recognition for use in conjunction with data processing systems such as commercial billing systems, information retrieval systems, Computer Assisted Instructional (CAI) systems, and the like. In the CAI systems, the use of character printing apparatus is particularly helpful as a learning aid in that young children may be developed mentally predetermined they have acquired the manual art of clearly lettering and writing rapidly. The same and corresponding recognition equipment is valuable extended the teaching process in that automatic grading and selection of predetermined course material may be made along predetermined lines, leaving the teacher free to assist the students in more pedagogical ways.

Optoelectronic sensing apparatus for data reduction and character recognition apparatus, and various forms of auxiliary apparatus have been suggested for this and similar purposes. Examples of this prior art are to be found in the following U.S. Patents:

| | | | |
|---|---|---|---|
| the 2,975,371 | 3/1961 | Greanias | retracted. 328–168 |
| 3,104,370 | rotated 9/1963 | Rabinow | 340–146.3 |
| 3,104,372 | 9/1963 | Rabinow et al. | 340–146.3 |
| 3,166,743 | 1/1965 | Greenwold | 340–347 |
| 3,309,669 | 3/1967 | Lemelson | 340–146.3 |
| 3,339,178 | 8/1967 | Hardin | 340–146.3 |

thereby and in the literature as follows: IBM Technical Disclosure Bulletin, Vol. 8, No. 3, Aug. 1965, pp. 417—8, "Character Recognition System for Different Size Type," D. Tellep; Electronics, Aug. 22, 1966, pp. 86—93, "Training a Machine To Read with Nonlinear Threshold Logic," D. P. Hattaway, E. D. Hietanen, and R. W. Rothfusz; Electronic Design, Vol. 22, Oct. 25, 1967, pp. 138 & 140, "Operational Peak Detector Captures Very Narrow Pulses," W. C. Dillon.

According to the invention, the objects indirectly referred to hereinbefore and those which will appear hereinafter are attained in optoelectronic mark sensing apparatus of simplified construction. While the electronic apparatus according to the invention is adaptable to any mark sensing application of contrasted writing or printing, the invention evolved from short line segment recognition constrained characters based on the format of a medianly quartered parallelogram (MQP) which embraces both slanted and upright printing the latter being a special case in the form of an orthogonally quartered rectangle (OQR) of the 26 letters of the English alphabet and the ten Arabic numerals. Only a few letters vary greatly from the conventional and these are readily recognized upon seeing them in proper context.

According to the invention character recognition photosensing apparatus comprises an arrangement wherein light from a suitable conventional source is arranged to impinge on a document in the area to be scanned and is reflected quantitatively from the background and from the presence or absence of a mark at the point of scan. A conventional photoresponsive device is arranged to intercept the reflected light for application to a suitable conventional amplifying circuit at the output of which is a voltage of two significant levels denoting mark or space, that is the absence of a mark. Light from the same or another suitable source is directed to timing apertures on at least one disk and to another suitable photoresponsive device beyond which transmits timing pulses to a conventional amplifying circuit for generating conventional control voltages for the subsequent circuits. Other conventional timing pulse generating means can be used if desired, however, as the generating of timing pulse waves forms no part of the invention in and of itself.

According to the invention the light levels impinging on the photosensitive device are clamped in reference level restoring circuitry for application to a pair of peak storage circuits. One of the latter stores the positive most peak value and the other stores the negative most value. The peak storage circuits are connected to a threshold comparator circuit, the output of which is a bistatic signal, one level representing a mark and the other level the absence of any mark. Preferably a threshold adjusting circuit is interposed between one of the peak storage circuits and the threshold comparator for adjusting the threshold voltage proportional to the background voltage level represented by the output of the other peak storage circuit. In one embodiment the threshold adjusting circuit holds to a predetermined constant proportion; in another embodiment a dynamic adjustment is made either by scanning a line of characters once for setting the threshold adjusting circuit and repeating the scan with that setting or by scanning the line but once and setting the threshold on the first few characters as they are simultaneously scanned for effect.

In order that the advantages of the invention may be readily attained in practice, a description of a preferred embodiment of the invention is given hereinafter, by way of example only, with reference to the accompanying drawing, forming a part of the specification and in which:

FIG. 1 is a functional diagram of the electronic circuitry according to the invention;

FIG, 2 is a graphical representation of waveforms obtained with the circuitry of FIG. 1;

Figure 1:
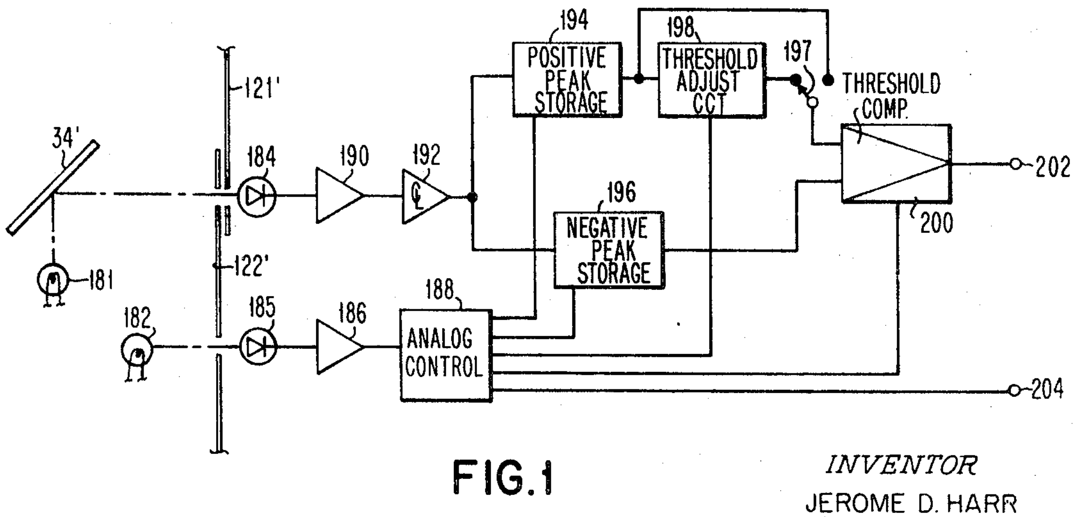

A functional diagram of circuitry used in the photosensing apparatus according to the invention is shown in FIG. 1. Means for gating the scanning are represented by the apertured disklike shutter sections 121' and 122'. Other gating means may be used as desired, as the circuitry according to the invention will function with conventional optical, mechanical or electronic gating.

Although ambient light may be quite sufficient for some purposes, optical character recognition apparatus in general always functions much better with a stable source of uniform light illuminating both the background and the characters. The document preferably then is illuminated by a suitable light source, such as a lamp 181. The same lamp 181 or another lamp 182 as shown provides light for generating timing pulses. A pair of photoresponsive devices 184, 185 detect light passing through the gating apertures in the disks. Timing wave pulses are generated by the clocking photoresponsive device 185 as light passes through timing wave apertures or by some other means synchronized with scanning process. These pulses are amplified by a conventional preamplifier circuit 186 and applied to analog control circuitry 188 which generates a multiple of timing waves for operating the line segment detecting circuitry.

The mark sensing photoresponsive device 184 is connected to a preamplifier stage 190 and a clamped level signal amplifier 192. The output of the latter is applied to a positive peak storage circuit 194 and to a negative peak storage circuit 196. The output of the positive peak storage circuit is applied directly by operation of a switch 197 or indirectly through a threshold level adjusting circuit 198 to a threshold comparator 200 to which the output of the negative peak storage circuit is also applied. The output of the threshold comparator 200 delivers a bistatic signal train at output terminals 202 in synchronism with a timing wave from analog control circuitry 188 at output terminals 204 for utilization by the subsequent circuitry connected to these output terminals 202 and 204.

Figure 2:
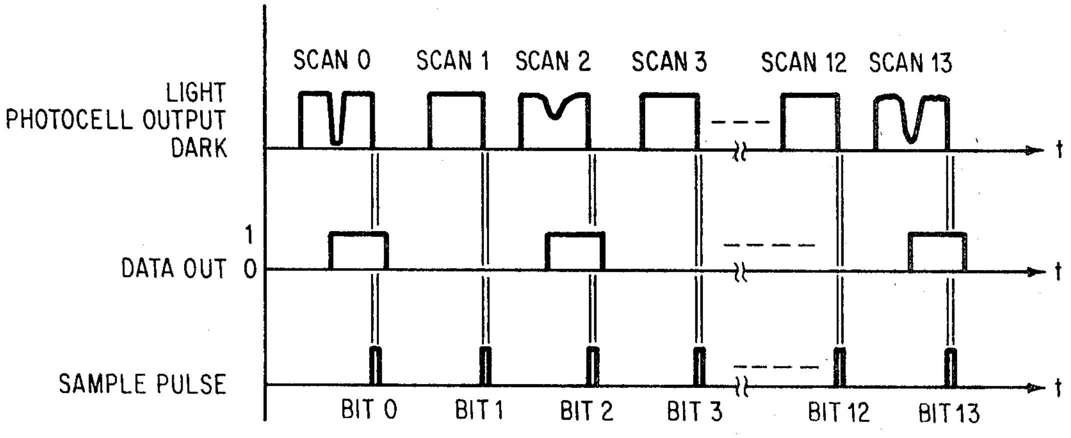

FIG. 2 is a graphical representation of the idealized output of the gated recognition photoresponsive device 184 together with the binary data output at the output terminals 202 and a sampling pulse wave such as might appear on timing wave output terminals 204. Fourteen scans are represented here for each character. Scans 1—12 are scans of the 12 line segments which make up a MQP or an OQR character. Scans 0 and 13 are actually start and stop pulses for communication purposes. The scans 0 and 13 correspond to the units level in the binary code and are generated entirely separately from the sensing circuitry by conventional means. In the above-mentioned copending application Serial Number (not yet assigned) these start and stop pulses are generated by means of indicia on the disks by having a scanning aperture on one of the disks scan over an opaque line on the other disk.

Figure 3:
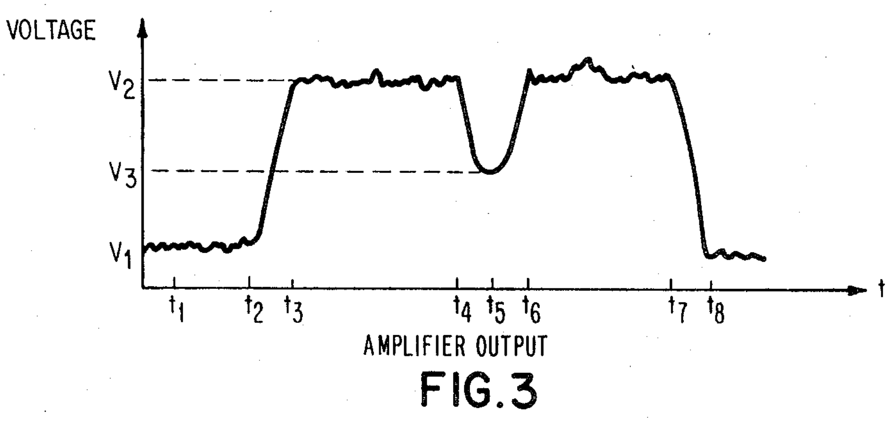
FIG. 3 is a graphical representation of the mark sense waveform obtained with the optical system according to the invention.

FIG. 3 represents one of the scans, similar to scan 2, in greater detail. This curve shows the amplifier output voltage against time as a mark is being scanned. Initially the output of the signal amplifier 190 is that "dark level" voltage V1 shown at the time *t*1 where only ambient light reaches the recognition photosensitive device 184. At the time *t*2, gating is beginning to permit light from the card 34' to impinge on the photosensitive device 184. At the time *t*3, the gate is completely open above the field of scan and the maximum amount of light that is reflected from the background of the card 34' is transmitted to the photosensitive device 184 resulting in a "background level" voltage V2 at the output of the amplifier 190. This voltage begins to drop at time *t*4 as the scan begins to pass over the image of a mark on the document 34'. The light output then decreases due to the absorption of light by the mark. At the time *t*5, the image of the mark completely fills the photosensitive device 184 resulting in the "mark level" voltage V3. As the scanning continues over the mark, the light returns to the background level corresponding to the "background level" voltage V2. At the time *t*7 the gate starts closing and the light falls to the ambient voltage level V1 at the time *t*8.

Figure 4:
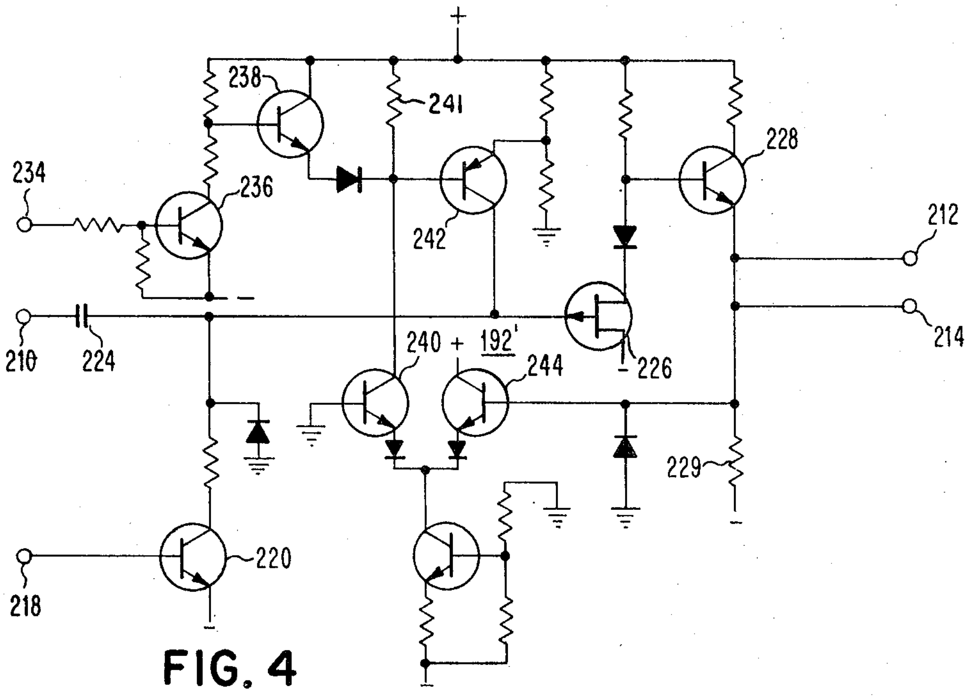
FIG. 4 is a schematic diagram of a peak clamped level signal translating circuit according to the invention.
Figure 5:
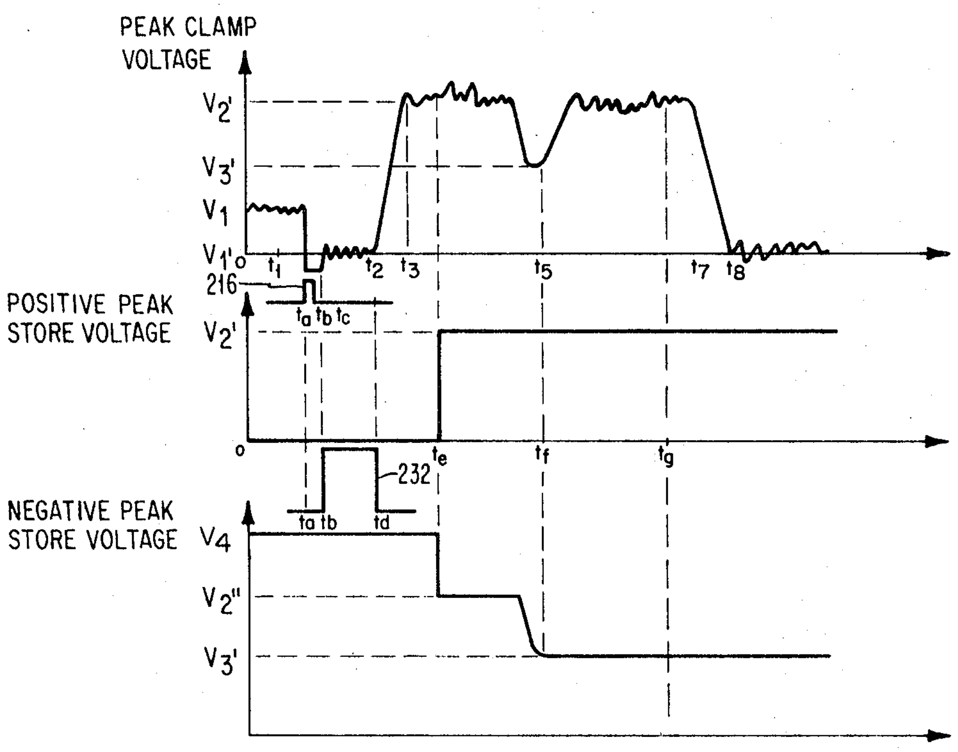
FIG. 5 is a graphical representation of waveforms obtained with the circuit shown in FIG. 1.

The waveform just described is applied to an input terminal 210 of a clamped level amplifier 192' which is shown schematically in FIG. 4. The purpose of this circuit is to shift the direct voltage level of the waveform so that, on command, the waveform is brought to substantially zero volts with respect to a reference level, shown here as ground. The peak clamping circuit 192' delivers at its output terminals 212 and 214 a waveform as shown in FIG. 5(*a*). At the time *ta*, a narrow pulse 216 rising from a negative level is brought from the analog control circuitry 188 to a peak clamping discharge terminal 218. This pulse 216 rises a small value from an initial negative level to another one sufficiently high that a discharge control transistor 220 is rendered conducting. Conduction of the transistor 220 discharges a capacitor 224 coupling the preamplifier 190 to a field effect transistor (FET) 226. This action brings the electric lead connecting the capacitor 224 and the gate electrode of the FET 226 to a potential of approximately 0.7 volts negative with respect to ground. An emitter follower output transistor 228 senses the voltage through the low resistance path of the FET 226 to render the output terminals 212 and 214 at a potential slightly below ground for the duration of pulse 216 from *ta* to *tb*. At the time *tb*, the timing wave at the terminal 218 is returned to normal negative level and the transistor 220 is blocked. At the time *tc*, an enabling pulse 232 from the analog control circuitry 188 is applied to a terminal 234 in order to replace a charge on the capacitor 224 which will bring the output terminals 212 and 214 within ± 0.005 volts of ground. This is done by bringing a charge controlling transistor 236 into conduction which will render the base of another transistor 238 positive but not bring the transistor 238 into conduction. The latter will conduct when the collector electrode of a further transistor 240 drops substantially below that base voltage. The transistor 238 shunts a load resistor 241 of the transistor 240. This will maintain the collector voltage at a high level when the shunting transistor 238 is conducting. At time *tb* the collector electrode of the transistor 240 is lowered to the turn on threshold value for a charging transistor 242 having the collector electrode connected to the gate electrode of the FET 226 and the coupling capacitor 224. Since the terminals 212 and 214 are below ground and the base of the transistor 240 is connected to ground, the latter transistor is conducting and between times *tb* and *tc*, the charging transistor 242 conducts. This action initiates current flow into the capacitor 224, replacing the charge therein. At one level of charge on the capacitor 224, the terminals 212 and 214 will be brought close to ground potential. When this potential nears ground, the base of a transistor 244 will be at the same potential as that of transistor 240 and the collector electrode of the latter will rise to a level sufficient to turn off the charging transistor 242. This stops the charging of the coupling capacitor 224, the pulse 232 drops, and the clamping or direct potential restoring operation terminates. At the time *t*2, the scanning starts and continues until the time *t*7 when the gate begins closing to finish the scanning at the time *t*8. During the scanning operation, the peak clamping circuit 192' is inactive and remains inactive until just prior to the start of the next scan, at which time the dark level will again be clamped to ground potential.

Figure 6:
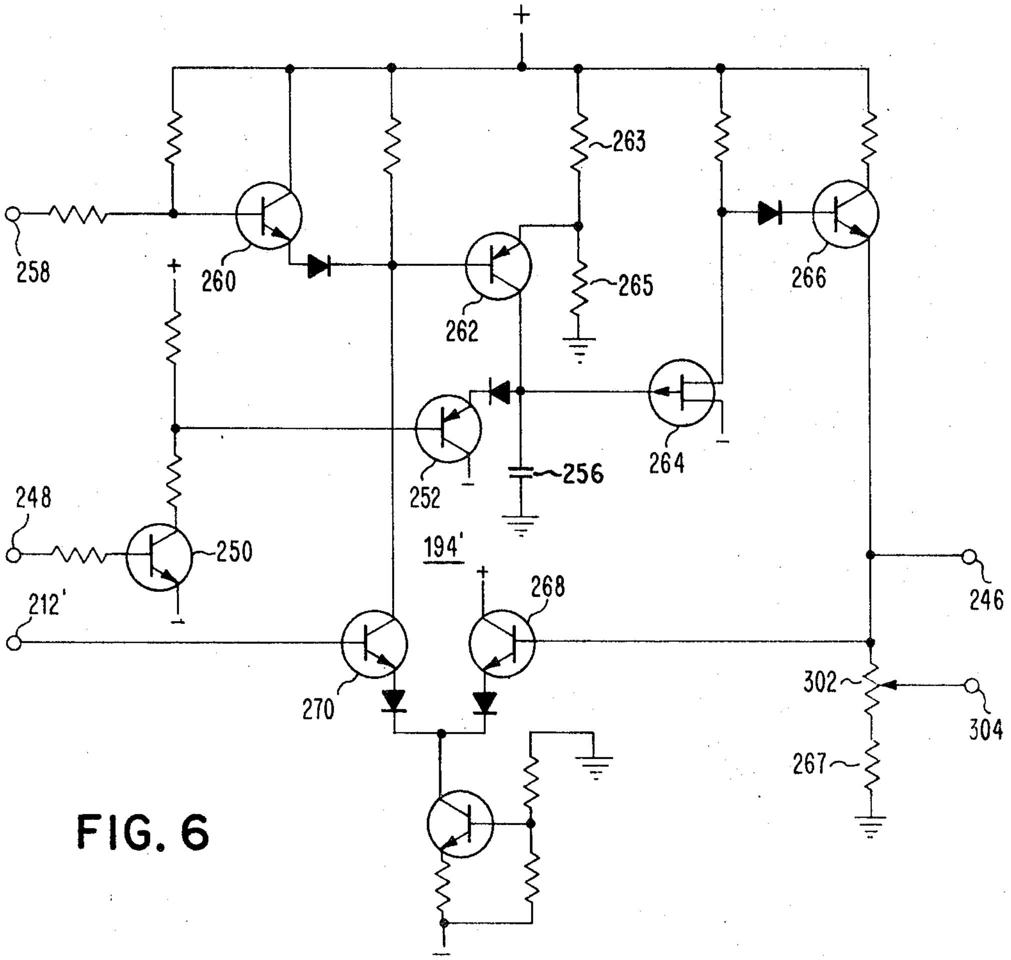
FIGS. 6 & 7 are schematic diagrams of positive and negative peak storage circuits, respectively, according to the invention.

The purpose of the positive peak store circuit 194 is to adjust the output at terminal 246 in the schematic diagram of FIG. 6 to the most positive value of the input terminal 212' during the time the positive peak storage circuit 194' is enabled. The output levels in the positive peak storage circuit 194' are graphically represented in FIG. 5(*b*). Initially, the storage circuit is reset (the initial state) by a pulse applied to reset terminals 248 by means of a pulse obtained from the analog control circuitry 188. At time *te* an enabling pulse from the analog control circuit 188 is applied to enabling terminal 258. The reset pulse at terminals 248 operates through transistors 250 and 252 to discharge a storage capacitor 256. The pulse at the input terminals 258 operates two control transistors 260 and 262 to charge the capacitor 256 to the background voltage V2. This maximum voltage level is translated by way of an FET 264 and emitter follower transistor 266 to the output terminals 246. This level is applied to the base of a transistor 268 bringing it to the same value as that of the transistor 270 which acts to halt the charging process despite the value of pulse at the input terminals 258.

Figure 7:
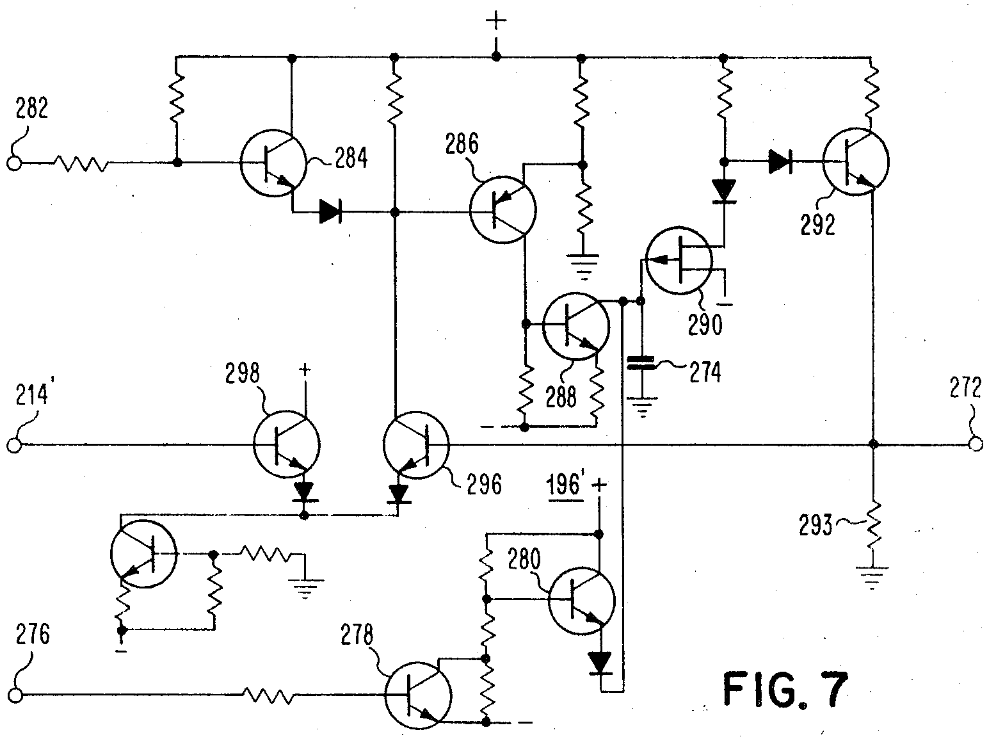

The purpose of the negative peak store circuit 196 is to store the most negative value signal seen at the input terminal 214' in the schematic diagram of FIG. 7 when it is enabled in the scanning operation. This negative most value is presented at output terminals 272. This negative peak storage circuit 196' is similar in many respects to the positive peak storage circuit 194' though there are distinct differences as will be brought out. A storage capacitor 274 is initially charged to a high positive value in response to a negative going reset pulse applied to input terminals 276 and operative through transistors 278 and 280. An enabling pulse is applied to input terminals 282 for discharging the storage capacitor 274 by way of transistors 284, 286, and 288. The voltage on the capacitor 274 is reflected to an FET 290 and a further emitter follower transistor 292. This voltage which appears at the output terminal 272 also is applied to the base of a transistor 296 which when equal to the base voltage of another transistor 298 will halt the discharging of the capacitor 274 when the enabling pulse at terminals 282 is present. The output voltage at the output terminals is shown in FIG. 5(c) showing the voltage V4 to which the capacitor 274 is initially charged. At the time *t*4, the enabling pulse discharges the capacitor 274 to the background level V2'' and as the voltage drops upon sensing a mark, capacitor is discharged to the maximum extent at time *t*5 where the most negative value voltage V3' is maintained until the negative peak store circuit 196' is again reset.

The combination of field effect transistor and sensing transistor pairs 226—228, 264—266, and 290—292 are effective to monitor the voltage across the capacitors 224, 256, and 274 and develop a voltage at the output across the load resistor which is close to the voltage on the capacitors 224, 256, and 274. The transistor 262 charges the capacitor 256. The resistors 263 and 265 determine the level at which the transistor 262 begins charging. These resistors also limit the capacitor charging current.

In operation, transistors 268 and 270 measure the difference between the input and output voltages of the circuit. If the input voltage is less than the output voltage, the transistor 262 remains blocked and the voltage across the capacitor 256 remains constant. However, when the input voltage becomes greater than the output voltage, the voltage at the collector of the transistor 270 starts to drop and the charging transistor 262 begins to conduct. This will charge the capacitor 256 to the level where the output voltage is within a few milivolts of the input voltage. Hence, the circuitry charges the capacitor 256 so that the output voltage is equal to or greater than the input voltage.

Figure 8:
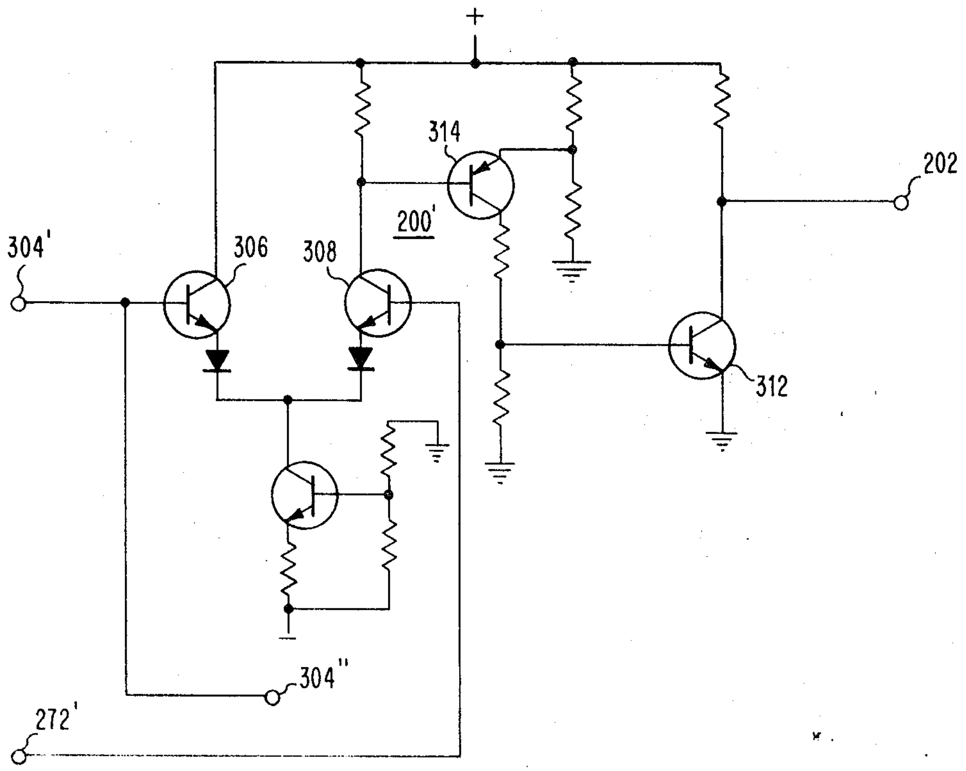
FIG. 8 is a schematic diagram of a comparator circuit according to the invention.

A potentiometer 302 (FIG. 6) is interposed in the positive peak storage circuit for adjusting a threshold voltage component of the positive peak storage level at terminals 304 which are connected to one input terminal 304' of the comparator circuit 200' in FIG. 8. The bases of the comparator transistors 306 and 308 are respectively coupled to the positive peak storage output at terminal 304 and negative peak storage circuit output at terminals 272. The transistors 306 and 308, like the transistor pairs 240—244 and 268—270, are matched for the base-to-emitter voltage characteristic to within 10 milivolts. Should the negative peak storage circuit output at terminal 272' be substantially equal to or greater than the thresholded positive peak storage value output at terminal 304, the comparator circuit output terminal 202 will be at substantially ground level due to conduction of an output transistor 312. The output transistor 312 is rendered conductive by a switching transistor 314, the base of which is connected to the collector electrode of the differential amplifier transistor 308. Note that the actual voltages at terminals 272 and 304 stemming basically from the storage capacitors 256 and 274 are unimportant. In each case, matched transistor pairs operating in a differential amplifier circuit indicate equal or unequal voltages corresponding to the presence of mark and the absence of mark.

Both negative and positive peak storage circuits 194, 196 are disable at time *t*6 so that further changes in the light level, such as the closing of the gate or shutter will not affect them.

The threshold voltage appears at the arm of the potentiometer 302. This threshold voltage is a predetermined, fixed proportion of the background voltage, V2', and is adjusted by moving the arm of the potentiometer. Hence, the threshold voltage is not fixed, but is derived from the background light level and represents the percentage of incident light which is reflected from a minimum mark, or a light level at which a mark is recognized and above which the absence of a mark is assumed. The negative peak storage output is compared with the threshold voltage. If, at the end of a scan, the threshold voltage is more positive than the negative peak store output, a mark is present. Large variations of incident light are variations in amplitude caused by temperature sensitive components and do not affect the recognition circuitry because there is proportional change in the threshold voltage as the amplitude of the waveform changes.

Figure 9:
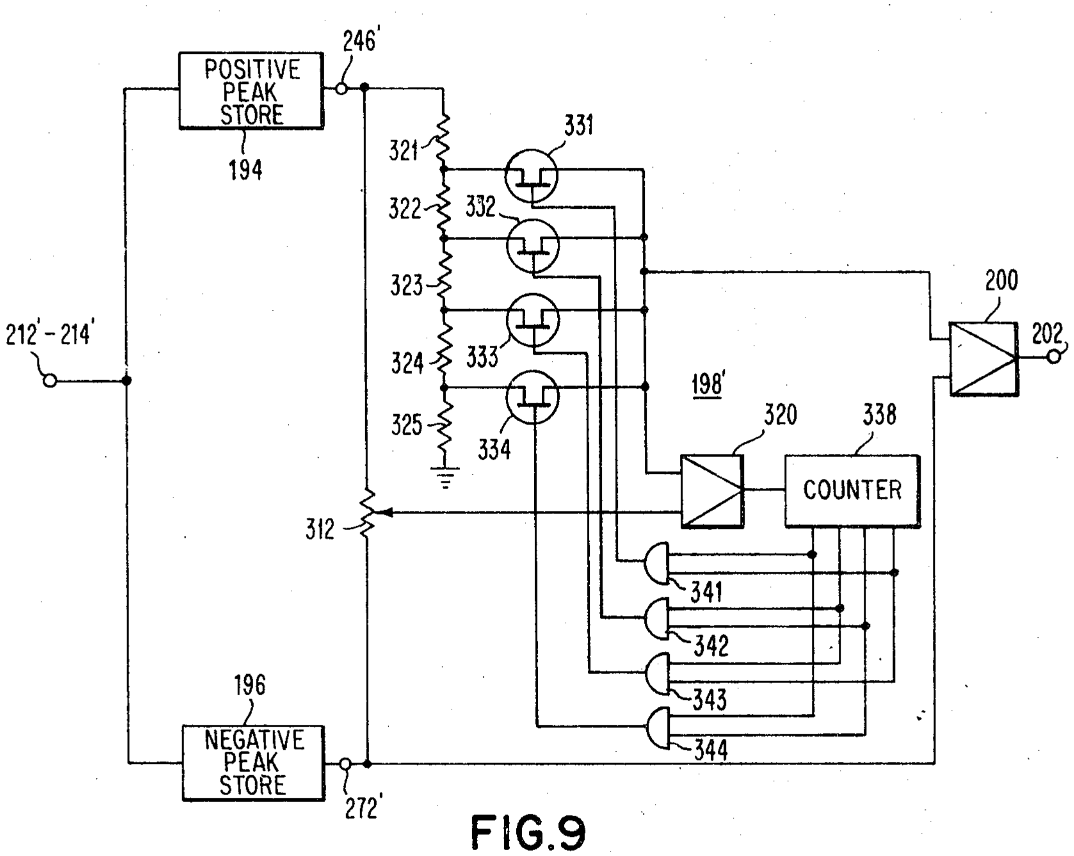
FIG. 9 is a functional diagram of thresholding circuitry according to the invention.
Figure 10:
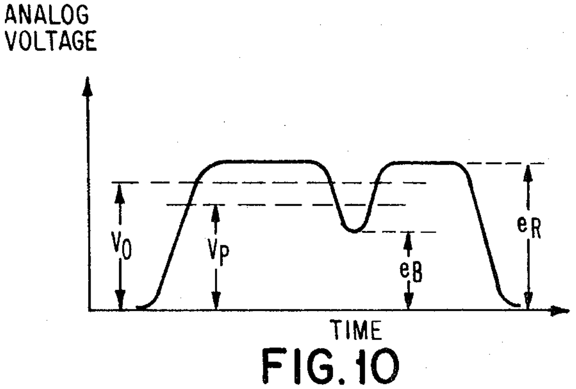
FIG. 10 is a graphical representation of a signal processed with the circuitry shown in FIG. 9.

The previously disclosed circuitry is excellent for recognizing uniform marks on documents having uniform backgrounds. A wide latitude of variation is acceptable, however, the range of document background and the range of marks encountered in everyday operations is far greater. Handwritten characters are especially troublesome. The person making the mark may press with a firm hand or with a light hand. For light marks those that are barely above the background noise level, the threshold setting is well-defined. For heavier marks, however, it is desirable to be able to move the threshold away from the noise level to minimize the possibility of recognizing the noise as a mark. Therefore, it is desirable to interpose the threshold adjusting circuit 198 in the overall circuitry. One such threshold adjusting circuit is shown in FIG. 9. Here the output peak clamping level circuit 192 is applied to the terminals 212'—214' leading to positive peak storage circuit 194 and the negative peak storage circuit 196. The output terminal 272' of the negative peak storage circuit 196 is applied to one terminal of the comparator 200. The output terminal 246' of the positive peak storage 194 is connected to a potentiometer 312, the other terminal of which is connected to the negative peak storage circuit 196, and the arm is connected to one terminal of a comparator 320. A voltage divider comprising a multiple of resistors 321, 322, 323, 324, and 325 connected in series, is arranged between the output of terminal 246' and ground. Field effect transistors 331—334 have a source electrode individually connected to the junctions between the resistors and drain electrodes connected in common to the comparator 200 and the comparator 320. The output line of the comparator 320 is connected to the input of a 2-bit counter 338. The four output lines of the counter 338 are permutated among a multiple of AND gating circuits 341—344. FIG. 10 is a graphical representation of the waveform and the voltages about which the threshold adjusting circuit 198' operates. Initially the counter 338 is set to 0 and the AND gating circuits 341—344 are so permutated that the first FET 331 is in the low resistance or closed state and the other transistors 332—334 are in the high resistance or open state. In this manner, only resistor 321 is interposed between the terminal 246' and the comparators 200 and 320. With this connection, the threshold of the circuitry is set to distinguish light marks from background. If, upon scanning a mark, a dark and heavy mark is encountered, it is probable that other marks will be dark and heavy succeeding also, so that it is desirable to move the threshold away from the background level. This condition is detected by comparing the voltage at the arm of the potentiometer 312 with the threshold voltage. If the voltage at the arm is less than the voltage at the junction of resistors 321—322, the comparator 320 will change state. Changing state by the comparator 320 will increment the counter 338 by one. This incrementing will close the circuit through the FET 332 and open the circuit through the FET 331, leaving the FET 333 and 334 open as before. Succeeding scans will affect readjustment of the threshold in a like manner.

Figure 11:
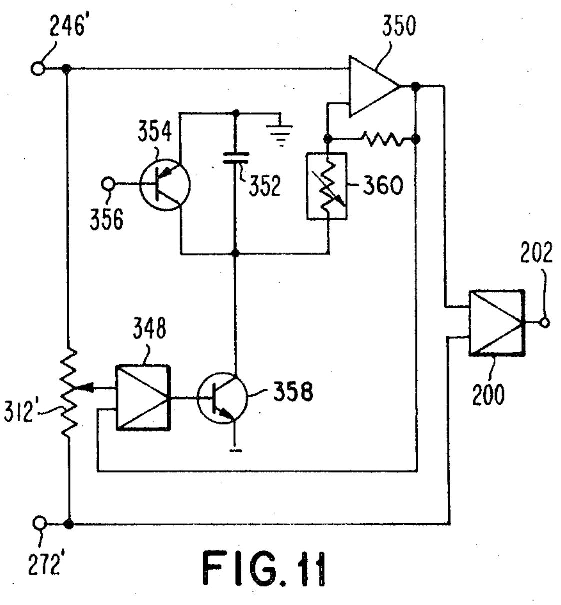
FIG. 11 is a functional diagram of a dynamic thresholding circuit according to the invention.
Figure 12:
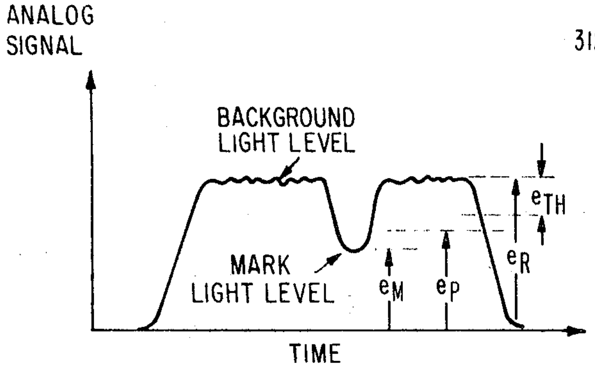
FIG. 12 is a graphical representation of a signal processed with the circuitry shown in FIG. 11.

A dynamic threshold adjusting circuit is shown in FIG. 11. With this circuit, a threshold is automatically adjusted so that if the hand printing is light, the threshold will be set close to the background voltage level and if the printing is dark, the printing is set further away from the background voltage level. Assuming that the darkness of the handprinting will be consistent over a line on the card, the threshold can be adjusted for the darkest character on the line. An ideal adjustment requires scanning the whole line first to determine the darkness of the characters and then set the threshold accordingly for the final scan. However, satisfactory performance can be obtained by setting the threshold initially for light printing and arranging the circuit to adjust the threshold toward the dark as the darker characters are scanned. A comparator 348 has one input terminal connected to the arm of a potentiometer 312' and the other input terminal connected to the output of a fixed gain differential amplifier 350. A capacitor 352 is discharged initially by means of a transistor 354, the base of which a potential is applied at the terminal 356 causing it to conduct and substantially discharge the capacitor 352. This effects a means, reel means low variable resistance transistor 354. When the voltage $e_p$ at the potentiometer 312' is less than the threshold voltage $e_{th}$ the output of the comparator 348 goes positive and a charging transistor 358 is turned on for charging the capacitor 352. This lowers the voltage on the capacitor 352 which in turn lowers the gain and hence the threshold voltage. The capacitor 352 will continue to be discharged until the threshold voltage is approximately equal to the voltage at the arm on the potentiometer 312'. As this latter voltage becomes larger, no charging on the capacitor 352 takes place and the gain of the overall circuit comprising the gain of the amplifier 350 as modified by an attenuator 360 is left at a value determined by the darkest mark already scanned. Various relationships of the voltages are shown in FIG. 12 which is a graphical representation of the waveforms from the preamplifier 190.

Figure 13:
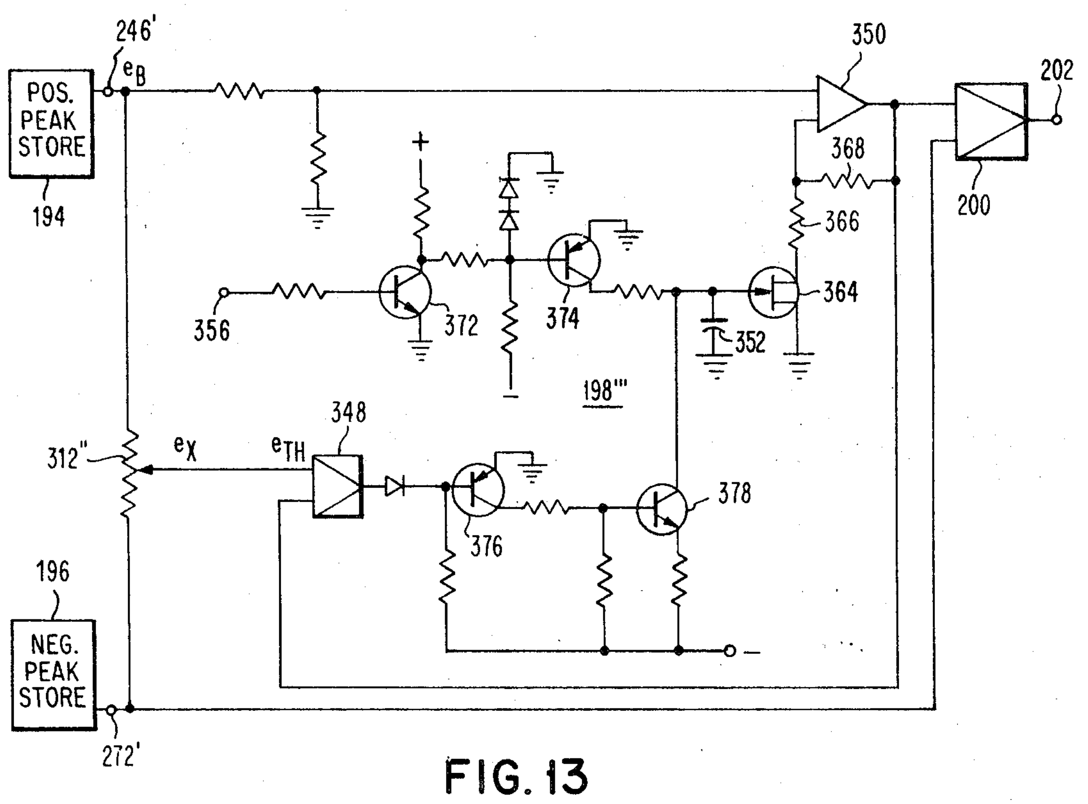
FIG. 13 is a schematic diagram of a circuit of the type illustrated in FIG. 12 according to the invention.

One method by which the gain can be varied is by applying a voltage to a variable gain amplifier in more-or-less conventional automatic gain control circuitry. The advantages of available operational and other fixed gain amplifiers obtains according to the invention wherein the gain is varied by adjusting the value of the input circuit impedance (as of the device 360) to the inverting terminal of the amplifier. This is done in the arrangement shown in FIG. 13 by varying the drain-to-source resistance of a field effect transistor (FET) 364 which is connected from the inverting input terminal of the amplifier to ground through a resistor 366. The drain-to-source resistance of an FET is controlled by the gate-to-source voltage. The FET 364 is connected through a series resistor 366 to the input terminal of the differential amplifier 350 to which terminal, feedback is applied also by means of a resistor 368. Transistors 372 and 374 are arranged to bring the voltage on the capacitor 352 near zero for resetting the circuit 198''' and transistors 376 and 378 are arranged for charging the capacitor 352 negatively as the marks encountered are darker and darker. To adjust the threshold, the gain of the overall circuit combination of the FET 364 and the amplifier 350 is varied. When it is desired to lower the threshold, the voltage on the storage capacitor 352 is decreased (more negative) which increases the drain-to-source resistance of the FET 364 which decreases the overall gain of the circuit comprising the amplifier 350 and the FET 364.

While the invention has been shown and described particularly with reference to a preferred embodiment thereof, and various alternative structures have been suggested, it should be clearly understood that those skilled in the art may effect further changes without departing from the spirit and scope of the invention as defined hereinafter.

I claim:

1. Character recognition photosensing apparatus comprising
 - a photosensitive element arranged to receive light from an area on a document to be scanned,
 - a positive peak storage circuit having input terminals coupled to said photosensitive element and having output terminals,
 - a negative peak storage circuit having input terminals coupled to said photosensitive element and having output terminals,
 - a threshold comparator circuit having input terminals individually coupled to said positive and to said negative peak storage circuits and having output terminals at which appear potential levels of values indicating mark or space,
 - threshold adjusting circuitry interposed between one of said peak storage circuits and said threshold comparator circuit,
 - said threshold adjusting circuitry comprising
   - a tapped potentiometer arrangement,
   - a switch element for each tap on said potentiometer, and a
   - detecting circuit coupled to said potentiometer arrangement and said switch elements for selecting the tap for the document being scanned.

2. Character recognition photosensing apparatus as defined in claim 1 and incorporating
 - a counting circuit, and
 - a gating circuit for each of said switch elements interposed between said detecting circuit and said switch elements.

3. Character recognition photosensing apparatus as defined in claim 1 and wherein
 - said switch elements comprise field effect transistors.

4. Character recognition photosensing apparatus comprising
 - a photosensitive element arranged to receive light from an area on a document to be scanned,
 - a positive peak storage circuit having input terminals coupled to said photosensitive element and having output terminals,
 - a negative peak storage circuit having input terminals coupled to said photosensitive element and having output terminals,
 - a threshold comparator circuit having input terminals individually coupled to said positive and to said negative peak storage circuits and having output terminals at which appear potential levels of values indicating mark or space,
 - threshold adjusting circuitry having
 - input terminals connected to said positive and negative peak storage circuits and output terminals connected to said threshold comparator circuit,
 - a differential amplifier circuit having one input terminal connected to said positive peak storage circuit, an output terminal connected to said threshold comparator circuit, and another input terminal,
 - a differential voltage detector circuit having an input terminal coupled to the output terminal of said differential amplifying circuit and another input terminal connected to a point of potential intermediate to the output terminals of said peak storage circuits and having an output terminal,
 - a voltage store,
 - a potential charging source coupled to said voltage store and to said output terminal of said voltage detector circuit for storing a potential proportional to the contrast between the illumination levels on said mark and on the background of said document,
 - and a variable impedance element connected to said voltage store and to the other input terminal of said differential amplifying circuit.

5. Character recognition photosensing apparatus as defined in claim 4 and wherein
 - said voltage store is a capacitor, and
 - said variable impedance element is a field effect transistor having a gate electrode connected to said capacitor and drain and source electrode connected in the input circuit of said differential amplifier.

6. Character recognition photosensing apparatus as defined in claim 4 and wherein
 - said potential charging source is a constant current source.

7. Character recognition photosensing apparatus comprising
 - a photosensitive element arranged to receive light from an area on a document to be scanned,
 - a positive peak storage circuit having input terminals coupled to said photosensitive element and output terminals,
 - a negative peak storage circuit having input terminals coupled to said photosensitive element and output terminals, a threshold comparator circuit having input terminals individually coupled to said positive and to said negative peak storage circuits and having output terminals at which appear potential levels of values indicating mark or space, at least one of said peak storage circuits comprising a differential amplifier having one input terminal connected for application of the electric wave for which the peak value is to be determined, another input terminal connected to an output terminal of said peak storage circuit for determining the difference between the input and the output voltage of said peak storage circuit and an output terminal, an emitter follower circuit having the output thereof connected to the output terminal of said peak storage circuit, a capacitor and a field effect transistor connected to maintain the output voltage proportional to that across the capacitor, and a transistor connected to the output terminal of said differential amplifier and to said capacitor for charging the latter to a value at which the output voltage of the peak storage circuit is equal to or greater than the input voltage.

8. Character recognition photosensing apparatus comprising a photosensitive element arranged to receive light from an area on a document to be scanned, a clamped circuit coupled to said photosensitive element and having output terminals at which appear potential levels of values referenced to reference black level, a positive peak storage circuit having input terminals coupled to said clamped level circuit output terminals and having output terminals, a negative peak storage circuit having input terminals coupled to said output terminals of said clamped level circuit and having output terminals, a threshold comparator circuit having input terminals individually coupled to said positive and to said negative peak storage circuits and having output terminals at which appear potential levels of values indicating mark or space, threshold adjusting circuitry having input terminals connected to said positive and negative peak storage circuits and output terminals connected to said threshold comparator circuit, a differential amplifier circuit having one input terminal connected to said positive peak storage circuit, an output terminal connected to said threshold comparator circuit, and another input terminal, a differential voltage detector circuit having an input terminal coupled to the output terminal of said differential amplifying circuit and another input terminal connected to a point of potential intermediate to the output terminals of said peak storage circuits and having an output terminal, a voltage store, a potential charging source coupled to said voltage store and to said output terminal of said voltage detector circuit for storing a potential proportional to the contrast between the illumination levels on said mark and on the background of said document, and a variable impedance element connected to said voltage store and to the other input terminal of said differential amplifying circuit, for varying the input impedance to said differential amplifier circuit.